May 5, 1970

H. J. JEZEK 3,509,700

COTTON STRIPPING APPARATUS

Filed June 14, 1967

Henry J. Jezek
INVENTOR.

BY

ATTORNEYS

May 5, 1970
H. J. JEZEK
3,509,700
COTTON STRIPPING APPARATUS
Filed June 14, 1967
2 Sheets-Sheet 2
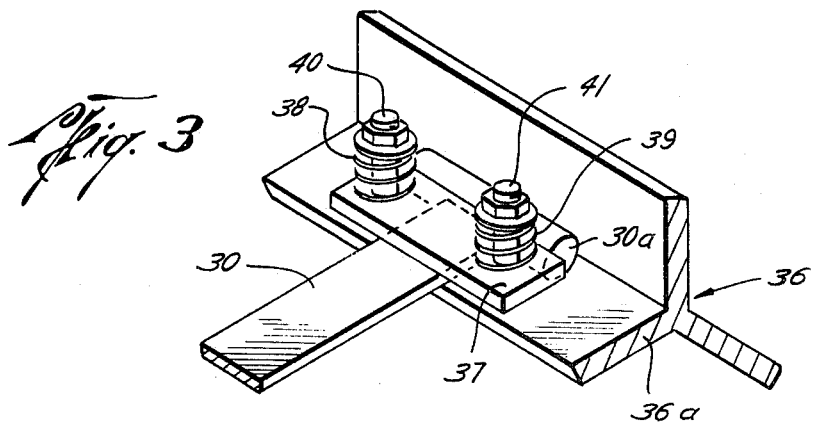
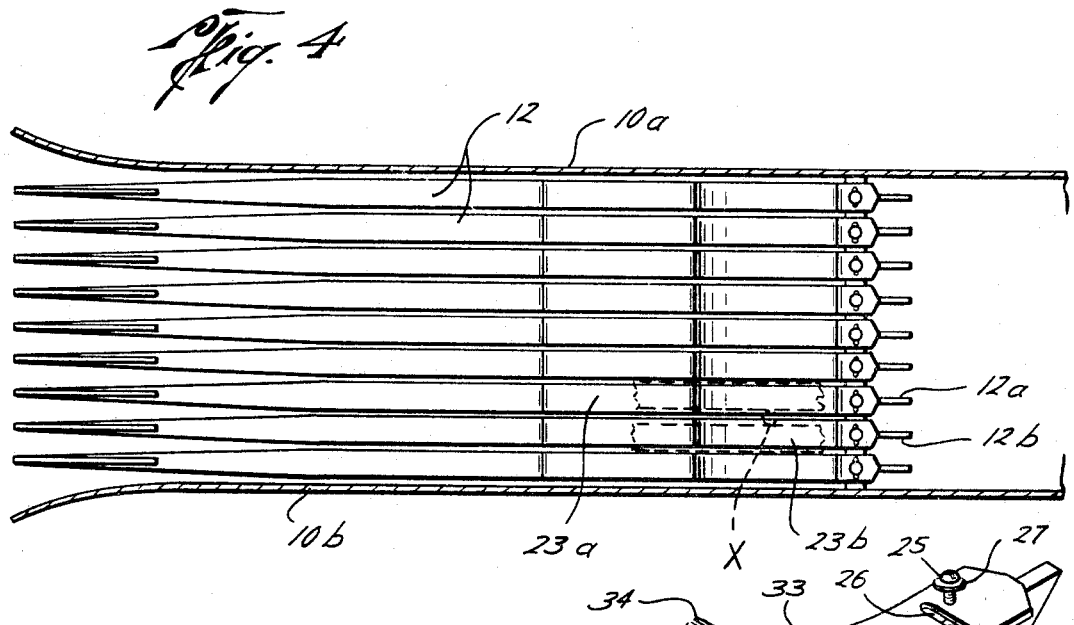
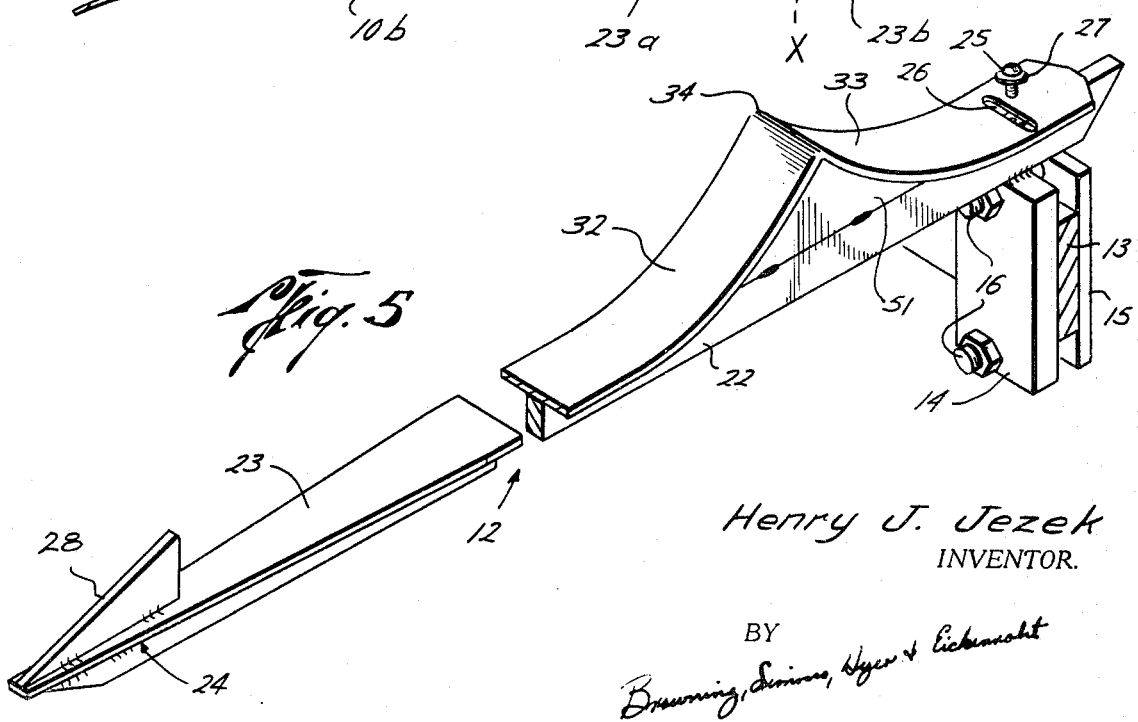
Henry J. Jezek
INVENTOR.
BY
ATTORNEYS

United States Patent Office 3,509,700
Patented May 5, 1970

---

3,509,700
COTTON STRIPPING APPARATUS
Henry J. Jezek, 1204 E. Downs Ave.,
Temple, Tex. 76501
Filed June 14, 1967, Ser. No. 645,993
Int. Cl. A01d *45/18*
U.S. Cl. 56—34                5 Claims

ABSTRACT OF THE DISCLOSURE

Cotton stripping apparatus is disclosed that includes a plurality of elongated cotton stripping fingers for moving through the cotton to strip the bolls from the cotton stalks. Each finger has an undulated upper surface that provides a ridge or wave crest intermediate the ends of the finger above the plane of the upper surface of the finger. The undulation provides a first portion of the top surface that is inclined downwardly from the crest or ridge toward the front end of the finger. A second portion of the surface is inclined downwardly from the crest or ridge toward the rear of the finger. Both such first and second portions of the top surface are arcuate. A first feeding reel having a plurality of prongs is mounted to rotate so that the ends of its prongs move along the first arcuate portions of the top surfaces on the fingers to move bolls stripped from the cotton rearwardly along the fingers to the crest or ridges in their upper surfaces. A second feeding reel having a plurality of prongs is located to rotate so its prongs move along the second arcuate portions of the top surfaces of the fingers to move the bolls from the crests or ridges to the rear end of the fingers from where they are transported to a collecting bin or hopper.

---

This invention relates to cotton strippers having a plurality of fingers that move through the cotton to comb or strip the bolls from the cotton stalks.

Cotton stripping apparatus of the type to which this invention relates has a plurality of elongated fingers mounted on a vehicle to extend in the direction of travel of the vehicle in spaced, parallel, side-by-side relationship. The fingers are mounted with their top surfaces, which normally comprise relatively wide stripping plates, inclined downwardly in the direction of travel of the fingers. The fingers are inclined downwardly to allow the lower part of the stalk to enter between the fingers first with the fingers moving progressively higher on the stalk, as the fingers move past the stalk. A rotating reel normally is located below and toward the rear of the fingers that tends to pull the cotton stalks downwardly through the fingers. This helps the fingers to pull the bolls from the stalks, instead of pulling the stalks from the ground. Located above the fingers are one or more rotating feeding reels having a plurality of prongs that tend to move the stripped bolls rearwardly along the upper surfaces of the fingers to a conveyor system that carries the bolls upwardly to a collection or storage bin.

In tall cotton the bolls are usually stripped toward the rear of the fingers. By locating the feeding reel above the rear portion of the fingers, it will do an efficient job of moving the bolls stripped from the tall cotton from the fingers into the conveyor system. When stripping short cotton, however, the bolls are stripped from the cotton before they reach a position on the fingers where the feeding reel can engage them and move them rearwardly into the conveyor system. An additional feeding reel can be located toward the front of the fingers to help relieve this situation when stripping short cotton. But even with two feeding reels, there is a space on the upper surface of the fingers that the prongs of either reel cannot reach. Consequently, a lot of cotton bolls fall off the side of the fingers and are lost.

It is an object of this invention to provide a cotton stripper having cotton stripping fingers designed to increase the distance the prongs of a feeding reel can move the cotton bolls rearwardly along the top surface of the fingers.

It is another object of this invention to provide such cotton stripping apparatus which can effectively move cotton bolls stripped from their stalks close to the front of the fingers all the way to the conveying apparatus at the rear of the fingers.

It is another object of this invention to provide cotton stripping apparatus that can be used in either tall or short cotton without having to make any adjustments in the apparatus.

These and other objects, advantages, and features of the invention are obtained by inclining a portion of the top surface of each finger upwardly toward the rear of the finger. The feed reel is located for its prongs to move in an arcuate path adjacent the upwardly inclined portion of the top surface to effectively move cotton bolls stripped from the cotton along a substantially longer portion of the finger, than was heretofore possible. In the preferred embodiment of the invention an undulation is formed in the top surface of each of the cotton stripping fingers to provide a crest or ridge in the top surface intermediate the ends of each finger. By doing this, an upwardly inclined portion is provided and a second portion inclines downwardly toward the rear from the crest. Two feeding reels are employed; one is located to sweep bolls up the first upwardly inclined portion to the crest. The second feeding reel is located for its prongs to pick up the cotton bolls, after they are moved past the crest by the prongs of the first reel, and move the bolls to the rear of the fingers along the second downwardly inclined portion of the top surface. Thus, the bolls are transferred from the prongs of the first feeding reel to those of the second without having to pass through a zone between the reels in which the reels are ineffective.

The invention will now be described in connection with the attached drawings, in which, FIG. 1 is a vertical cross sectional view of the preferred embodiment of the cotton stripping fingers of this invention;

FIG. 3 is a fragmentary view, on an enlarged scale, of a feeding reel prong mounting;

FIG. 4 is a top view of the stripping fingers taken along line 4—4 of FIG. 1; and FIG. 5 is an isometric view, on an enlarged scale, of one of the cotton stripping fingers employed in the preferred embodiment of the apparatus.

Figure 1:
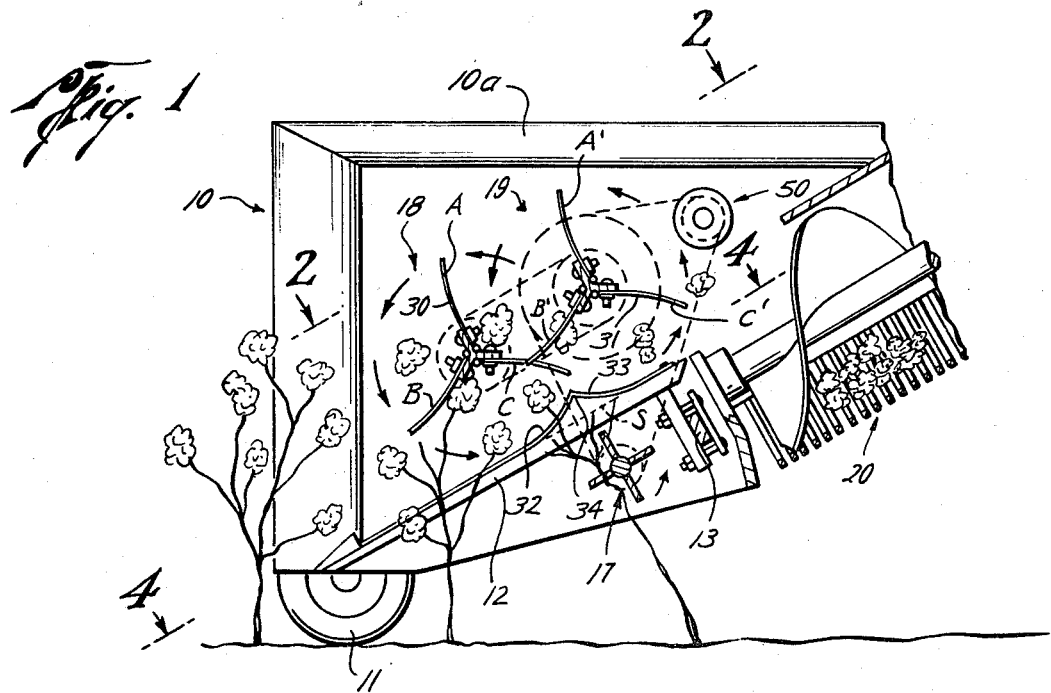
Figure 2:
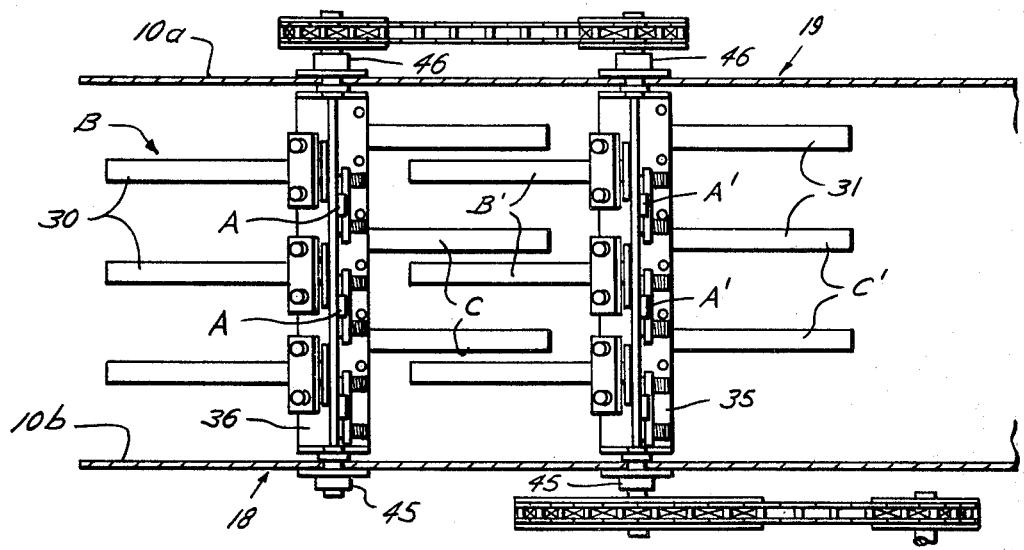
FIG. 2 is a top view of the feeding reels taken along line 2—2 of FIG. 1 but omitting the fingers to simplify the drawing.

The cotton stripping apparatus is mounted on vehicle 10, only the front portion fo which is shown in FIG. 1. The portion shown includes spaced side plates 10a and 10b and front wheel 11, which along with other wheels helps support the apparatus for movement along one or more rows of cotton.

The apparatus includes a plurality of cotton stripping fingers 12. Means are provided to mount the fingers on vehicle 10 to extend in the direction of travel of the vehicle generally in side-by-side, parallel, spaced relationship, as shown in FIGS. 1 and 4. In the embodiment shown, the fingers are mounted in this position on transverse mounting bar 13. Each finger is attached to the mounting bar by mounting plate 14, which is welded to the finger ass hown in FIG. 5, and retainer plate 15. Bolts 16, extending through both plates on opposite sides of the mounting bar, cause the plates to grip the bar sufficiently to hold each finger in the proper position.

Preferably, the fingers are inclined downwardly in the direction of travel of the vehicle as shown in FIG. 1. This causes the forward ends of the fingers to move under most of the cotton bolls. It also results in the fingers moving up the stalk, as they are moved by the vehicle, to strip the bolls from the stalks. Pulling the cotton stalks downwardly through the spaces between the fingers is stalk walker 17, located below and adjacent the rear of the fingers, as shown in FIG. 1. After the bolls are stripped they are carried rearwardly by first feeding reel 18 and second feeding reel 19. The feeding reels move the cotton bolls into screw conveyor 20, which carries the bolls upwardly into a hopper (not shown), which moves along with vehicle 10, as the cotton is being stripped.

The construction of each cotton stripping finger 12 is the same, so only one will be described in detail. As shown in FIG. 5, each finger includes elongated body 22. In the preferred embodiment shown, body 22 is made of plate and mounted with its sides generally vertical. The width of the plate narrows toward the front end of the finger, to increase its flexibility in a lateral direction. Extending along the top of body 22 and supported thereby is stripping plate 23. The stripping plate provides the top surface of the finger. It is welded to body 22 adjacent the front of the finger. This weld, indicated by the number 24, preferably extends only a short distance along body 22 to permit the rest of the stripping plate to move laterally of body 22 by bending the body. This lateral movement is desirable to permit the stripping plates on adjacent fingers to adjust the stalks of different diameters as they pass in between the fingers. For example, as shown in FIG. 4, stripping plates 23a and 23b on fingers 12a and 12b can move laterally to the dotted line positions shown to accommodate stalk X. In the stripping fingers shown, this lateral movement is limited by screw 25, which extends through laterally extending elongated slot 26 into body 22. Screw 25 is provided with washer 27 to prevent stripping plate 23 from moving upwardly away from body 22. Lug 28 is placed at the front end of the finger to help hold cotton bolls that may fall toward the front end of the fingers.

As can be seen in FIG. 1, even though the paths traveled by prongs 30 on feed reel 18 and prongs 31 on feed reel 19 overlap, there would be a "wave" shaped space along the surface of the fingers, where stripped bolls could stop moving rearwardly, stack up, and be pushed to the side and fall off of the fingers, if the top surface of the fingers was flat as indicated by dotted line S. In accordance with this invention, this dead space between the feeding reels is eliminated by providing stripping plate 23 with an undulated top surface that conforms substantially to the wave shaped space between the paths of the prongs of the two feeding reels.

As shown in FIG. 5, stripping plate 23 has first portion 32 of its top surface inclined upwardly from the plane of the upper surface toward the rear of the finger. It has second portion 33 of its top surface inclined upwardly from the rear of the finger toward the front thereof. These two surfaces intersect to provide crest or ridge 34 intermediate the ends of the finger. The undulated portion of the stripping plate is supported on finger body 32 by wave-shaped gusset 51, which is tack welded to the top of the body.

In the embodiment shown, surfaces 32 and 33 are arcuate and, preferably, the center of curvature of each is approximately the same as the axis of rotation of the feeding reel whose prongs sweep the surface. This will allow the ends of the prongs on the reels to travel along the length of these surfaces at substantially the same distance from the surfaces. The prongs of feeding reel 18 then will move bolls up first inclined surface 32 to crest 34. From the crest, prongs 31 on reel 19 pick up the bolls and move them down arcuate surface 33 to the rear of the fingers and into conveyor system 20. There will be a minimum loss of bolls and no stacking up of bolls, once the prongs pick up a boll and start it on its journey toward the rear of the finger.

The prongs on reels 18 and 19 are arranged to overlap to provide the most effective movement of bolls to the rear of the fingers. In the embodiment shown, each reel has three sets of prongs spaced 120° apart around their axis of rotation. These groups are designated A, B, and C on reel 18 and A′, B′, and C′ on reel 19. The fingers of each group designated with the same letter are arranged in line, but 180° out of phase. In other words, when group C of reel 18 is moving into the space between the reels, group C′ on reel 19 is well out of the way on the opposite side. With this arrangement, substantially the entire surface area of the group of fingers serviced by the feed reels can be covered with each revolution of the feed reel, without the fingers interfering with each other.

Frequently a rock or hard clod of dirt falls onto the fingers and is engaged by the prongs of one of the feed reels, as they are rotated. To avoid breaking a prong in such a case, they preferably are made of good spring steel, curved rearwardly slightly, and held in position by resilient means that will yield when necessary to avoid damage to a prong. The prongs are attached to central shafts 35 and 36 of the feeding reels in the manner shown in FIG. 3. Central shafts 35 and 36 extend between side plates 10a and 10b of vehicle 10. Where they pass through the side plates they are circular. They are supported for rotation by bearing assemblies 45 and 46.

The section of the shafts between the side plates comprises three plates connected together to extend radially from the longitudinal axis of the shaft along lines 120° apart. FIG. 3 shows one of prongs 30 mounted on plate 36a of reel 18. All of the prongs are mounted in the same way so only one is described in detail. The end of prong 30 is attached to bar 30a to provide a curved surface around which the prong can pivot. Resiliently holding prong 30 against plate 36a is hold down strap 37, coil springs 38 and 39, and bolts 40 and 41. The strap resiliently holds prong 30 in position through the downward resilient force of the coil springs. Bolts 40 and 41, with their associated nuts and washers, compress the springs the desired amount to provide the downward resilient force required to hold the prongs in place. Should the prongs encounter a rock, however, they will compress springs 38 and 39 sufficiently to allow them to pass the rock without damaging the reel, its drive system, or the prong.

Reels 18 and 19 are rotated in the same counterclockwise direction as viewed in FIG. 1. Appropriate sprockets and roller chain drives, arranged as shown, transmit power from power take off 50 to the feeding reels and stalk walker 17.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for stripping bolls from cotton stalks, comprising a plurality of elongated stripping fingers, means mounting the fingers on a vehicle to extend in the direction of travel of the vehicle generally in side-by-side, parallel, spaced relationship, a first feeding reel having a plurality of radially extending prongs, and means mounting the first feeding reel for rotation above the fingers and forward of the rearward end of the fingers for the prongs on the reel to move cotton bolls stripped from the stalks rearwardly along the upper surfaces of the fingers, each of said fingers having a portion of its upper surface rearward of the first reel inclined upwardly from the plane of the upper surface to increase the distance along the surface of the fingers the prongs of the first feeding reel can move the bolls, a second reel having a plurality of prongs, means mounting the second reel rearwardly of the first for the prongs thereon to move bolls rearwardly along the surface of the fingers, the upper surface of each finger being further provided with a second portion that is inclined downwardly toward the plane of the upper surface from the rearward end of the first inclined portion to increase the distance the second reel can move bolls along the surface of the fingers.

2. Apparatus for stripping bolls from cotton stalks, comprising, a plurality of elongated stripping fingers, means for mounting the fingers on a vehicle to extend in side-by-side, spaced, relationship generally in the direction of travel of the vehicle, each finger having an undulated upper surface formed by first and second portions of the upper surface that slope downwardly in opposite directions from a crest intermediate the ends of the fingers and above the plane of its upper surface, said first portion sloping downwardly in the direction of travel of the finger and said second sloping downwardly in the opposite direction, first and second reels, each having a plurality of prongs, means mounting the first reel forward of the first inclined portion for its prongs to sweep bolls stripped from the stalks rearwardly along the first sloping portions of the upper surfaces of the fingers to the crests between the first and second sloping portions, and means mounting the second reel for its prongs to sweep bolls from the crests on the upper surfaces of the fingers along the second downwardly sloping portions thereof toward the rear of the fingers.

3. The apparatus of claim 2 in which each finger includes a body for mounting on said vehicles and a stripping plate extending along and supported by the top of the body to provide said undulated upper surface of the finger, said stripping plate being fixed to the body adjacent its forward end, said finger further including means for holding the rear end of the plate against upward movement away from the body of the finger while allowing the finger limited lateral movement relative thereto.

4. The apparatus of claim 3 in which the means holding the rear of the plate on the finger includes an elongated laterally extending slot adjacent the rear of the stripping plate and a pin attached to the body and extending through the slot with a head for engaging the stripped plate to hold it from movement away from the body while allowing limited lateral movement of the plate relative to the body.

5. A stripping finger for use with cotton stripping apparatus comprising an elongated body and an elongated stripping plate extending along and supported by the upper surface of the body, said stripper plate having an undulated upper surface forming a crest intermediate its forward and rear ends that is raised above the plane of its upper surface with a first inclined surface extending downwardly from the crest toward the forward end of the finger and the plane of the top surface and a second inclined surface extending downwardly toward the rear end of the finger toward the plane of its top surface.

References Cited

UNITED STATES PATENTS

| | | | |
|---|---|---|---|
| 2,544,411 | 3/1951 | Altgelt | 56—30 |
| 2,616,236 | 11/1952 | Hartley | 56—34 |
| 2,934,877 | 5/1960 | Fowler | 56—34 |
| 2,947,408 | 8/1960 | Fowler | 56—34 XR |
| 3,067,561 | 12/1962 | Jezek | 56—34 |
| 3,380,232 | 4/1968 | Jezek | 56—34 |

RUSSELL R. KINSEY, Primary Examiner